United States Patent
Kochi (10) Patent No.: US 6,947,088 B2
(45) Date of Patent: Sep. 20, 2005

(54) IMAGE PICKUP APPARATUS HAVING A COMMON AMPLIFIER

(75) Inventor: Tetsunobu Kochi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 733 days.

(21) Appl. No.: 09/854,563

(22) Filed: May 15, 2001

(65) Prior Publication Data

US 2002/0018131 A1 Feb. 14, 2002

(30) Foreign Application Priority Data

May 16, 2000 (JP) .......................................... 2000-143674

(51) Int. Cl.[7] .......................... H04N 3/14; H04N 5/3335
(52) U.S. Cl. .................... 348/308; 348/294; 250/208.1; 271/291
(58) Field of Search ............................... 348/302–305, 348/308, 294; 250/208.1; 257/291, 292

(56) References Cited

U.S. PATENT DOCUMENTS

| | | | |
|---|---|---|---|
| 4,959,723 A | | 9/1990 | Hashimoto |
| 5,051,831 A | | 9/1991 | Hashimoto |
| 5,619,262 A | * | 4/1997 | Uno ........................... 348/308 |
| 5,955,753 A | | 9/1999 | Takahashi .................... 257/292 |
| 5,965,872 A | * | 10/1999 | Endo et al. .............. 250/208.1 |
| 6,091,449 A | | 7/2000 | Matsunaga et al. |
| 6,163,386 A | * | 12/2000 | Kobayashi et al. ......... 348/304 |
| 6,219,405 B1 | * | 4/2001 | Inoue ......................... 378/98.8 |
| 6,239,839 B1 | | 5/2001 | Matsunaga et al. |
| 6,300,978 B1 | | 10/2001 | Matsunaga et al. |
| 6,657,664 B2 | * | 12/2003 | Ueno ........................... 348/302 |
| 6,665,012 B1 | * | 12/2003 | Yang et al. .................. 348/308 |
| 6,759,641 B1 | * | 7/2004 | Loose .......................... 348/308 |
| 6,795,121 B2 | | 9/2004 | Matsunaga et al. |
| 2001/0013901 A1 | | 8/2001 | Matsunaga et al. |
| 2001/0052941 A1 | | 12/2001 | Matsunaga et al. |
| 2002/0149688 A9 | | 10/2002 | Matsunaga et al. |

FOREIGN PATENT DOCUMENTS

| | | | |
|---|---|---|---|
| JP | 9-46596 | 2/1997 | |
| JP | 9046596 | 2/1997 | ........... G94B/5/335 |
| WO | WO9707630 | 2/1997 | ........... H04N/5/335 |

OTHER PUBLICATIONS

Sunetra Mendis et al, "CMOS Active Pixel Image Sensor", IEEE Transactions on Electron Devices, vol. 41, No. 3, Mar. 1994, pp. 452–453.

* cited by examiner

Primary Examiner—David L. Ometz
Assistant Examiner—Gevell Selby
(74) Attorney, Agent, or Firm—Fitzpatrick, Cella, Harper & Scinto (57) ABSTRACT

To implement a solid-state image pickup element in which the peripheral circuit is downsized, there is provided a solid-state image pickup element including a plurality of pixel blocks each having a plurality of photoelectric conversion elements, a plurality of transfer switches each having one terminal connected to a corresponding photoelectric conversion element, a signal input portion commonly connected to the other terminal of each of the plurality of transfer switches, and an amplifier connected to the signal input portion, and a scanning circuit for outputting a scanning clock for each pixel block.

11 Claims, 10 Drawing Sheets

IMAGE PICKUP APPARATUS HAVING A COMMON AMPLIFIER

BACKGROUND OF THE INVENTION

1. Field of the Invention

The present invention relates to a solid-state image pickup element for obtaining an image signal and an image pickup apparatus using the same and, more particularly, to a CMOS compatible XY address amplifier type solid-state image pickup element and an image pickup apparatus using the same.

2. Related Background Art

Conventional solid-state image pickup elements have a MOS structure made up of a conductor such as a metal capable of performing photoelectric conversion, an insulator such as an oxide, and a semiconductor, and are classified into an FET type and CCD type depending on the photo-carrier moving method. Solid-state image pickup elements are used in various fields including a solar battery, image camera, copying machine, and facsimile apparatus, and are technically being increased in conversion efficiency and integration density. One of such solid-state image pickup elements is a CMOS process compatible sensor (to be referred to as a CMOS sensor hereinafter). Sensors of this type are proposed in documents, e.g., IEEE Transactions on Electron Device Vol. 41, pp. 452–453, 1994. Another CMOS sensor is disclosed in Japanese Laid-Open Patent Application No. 9-46596 in which the sensor is suitable for downsizing of pixels and addition/non-addition of a pixel signal can be arbitrarily switched.

In the prior art, downsizing cannot be effectively achieved unless the pitch of a vertical scanning circuit is also decreased along with pixel reduction.

Further, a scanning circuit for efficiently performing addition/non-addition switching operation has not satisfactorily been examined.

SUMMARY OF THE INVENTION

It is an object of the present invention to provide a solid-state image pickup element much smaller than a conventional solid-state image pickup element.

To achieve the above object, according to an aspect of the present invention, there is provided a solid-state image pickup element comprising a plurality of pixel blocks each having a plurality of photoelectric conversion elements, a plurality of transfer switches for transferring signals from the respective photoelectric conversion elements, and a common amplifier for receiving signals from the plurality of transfer switches, and a scanning circuit for outputting a scanning clock for each pixel block.

In this arrangement, the circuit scale of the scanning circuit can be reduced, resulting in a small area of the solid-state image pickup element.

The above and other objects and features of the present invention will be apparent from the following description in conjunction with the accompanying drawings.

DETAILED DESCRIPTION OF THE PREFERRED EMBODIMENTS

Preferred embodiments of the present invention will be described in detail below with reference to the accompanying drawings.

Figure 1:
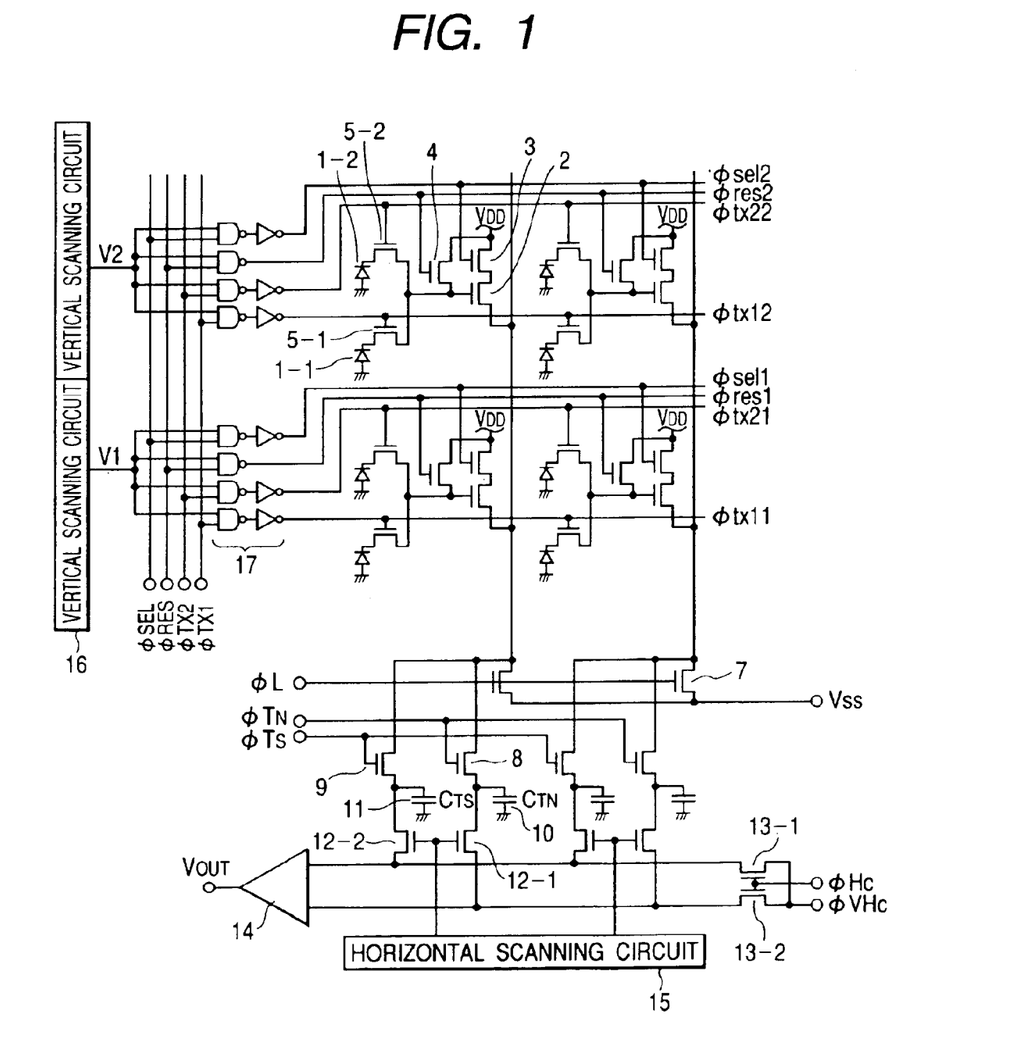
FIG. 1 is a circuit diagram for explaining the first embodiment of the present invention.

FIG. 1 is a circuit diagram showing the equivalent circuit of a solid-state image pickup element according to the first embodiment of the present invention. In FIG. 1, reference numerals 1-1 and 1-2 denote photoelectric conversion elements such as photodiodes; 5-1 and 5-2, transfer switch MOS transistors; 4, a reset MOS transistor; 2, an input MOS transistor of a source follower amplifier; 3, a vertical selection MOS transistor; 7, a source follower load transistor; 8, a dark output transfer MOS transistor; 9, a bright output transfer transistor; 10, a dark output accumulation capacitor; 11, a bright output accumulation capacitor; 12-1 and 12-2, horizontal transfer MOS transistors for transferring dark and bright outputs, respectively; 13-1 and 13-2, horizontal output line reset MOS transistors; 14, a differential output amplifier; 15, a horizontal scanning circuit; 16, vertical scanning circuits arranged for respective pixel blocks; and 17, an arithmetic operation processing unit constituted by AND and NAND gates in the first embodiment.

Figure 2:
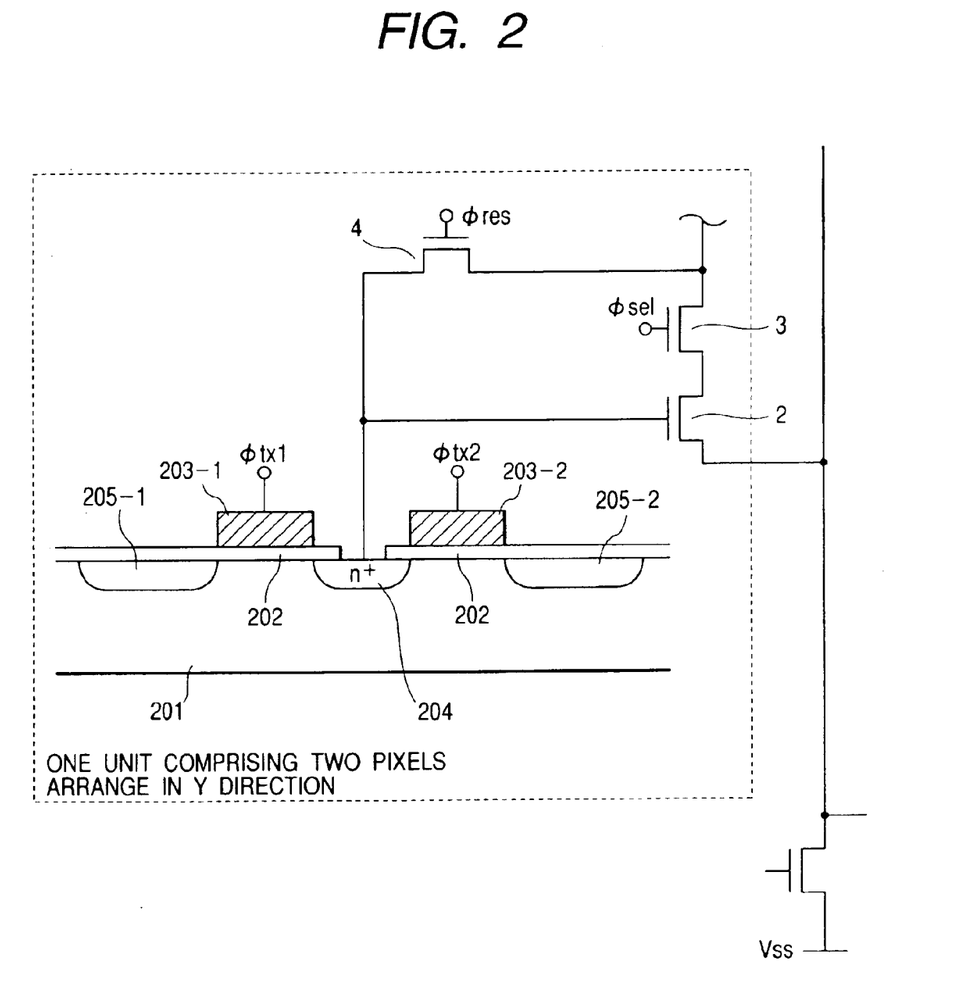
FIG. 2 is a sectional view showing a pixel according to the first embodiment of the present invention.

FIG. 2 is a sectional view of a pixel. In FIG. 2, reference numeral 201 denotes a p-type well; 202, a gate oxide layer; 203-1 and 203-2, gate electrodes of transfer MOS transistors formed from poly-Si or the like; 204, an $n^+$-type FD (Floating Diffusion) portion serving as a signal input portion; 205-1 and 205-2, photoelectric conversion portions. The FD portion 204 is connected to the two photoelectric conversion portions 205-1 and 205-2 via the transfer MOS transistors 5-1 and 5-2. In FIG. 2, the drains of the two transfer MOS transistors 5-1 and 5-2 and the FD portion 204 are shared by each other, thus increasing the sensitivity by micropatterning and reduction in the capacitance of the FD portion 204. Alternatively, the two transfer MOS transistors 5-1 and 5-2 may have their own drains which are connected by a metal line to form an FD portion.

Figure 3:
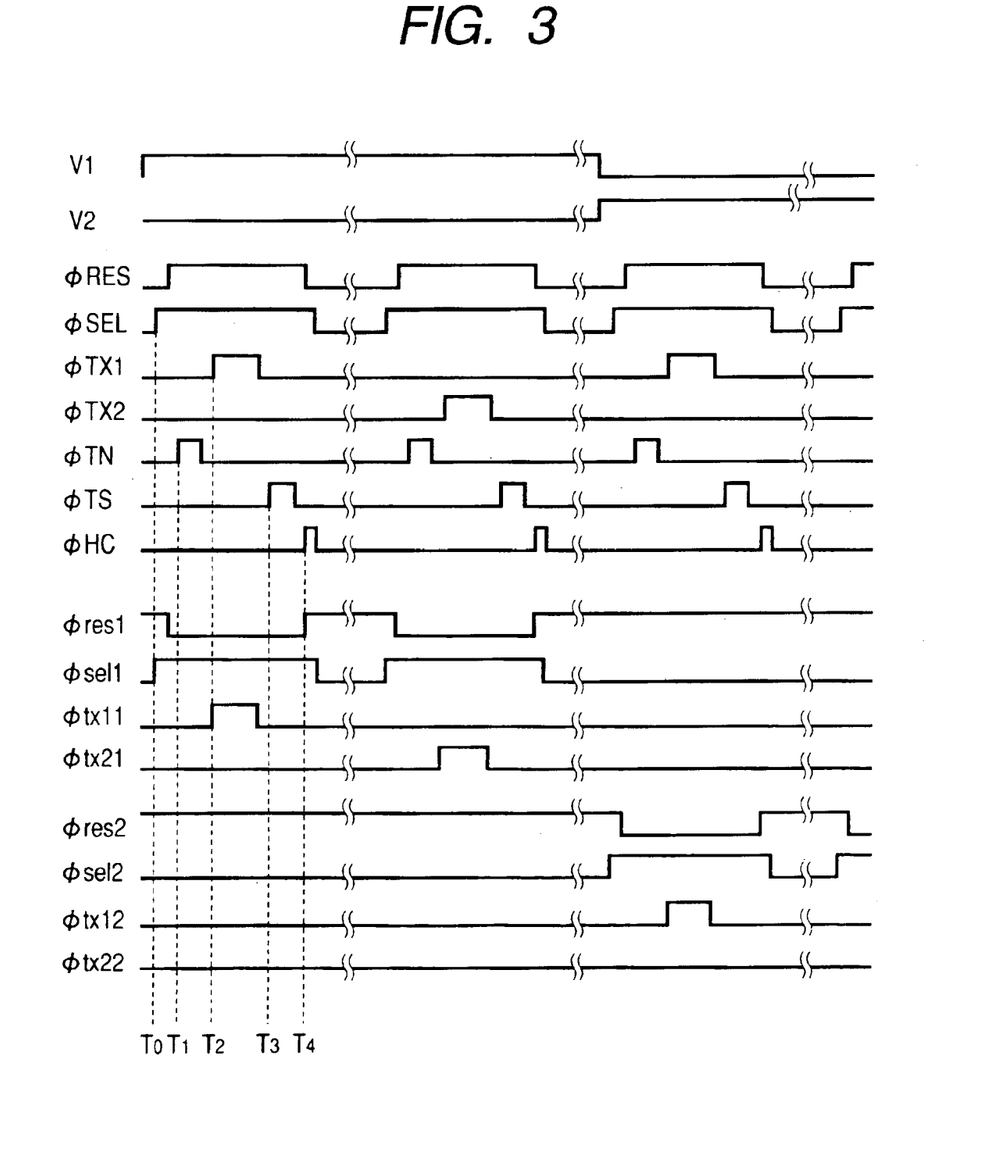
FIG. 3 is a first timing chart according to the first embodiment of the present invention.

The operation will be described briefly with reference to the timing chart of FIG. 3. In FIG. 3, V1 and V2 represent vertical scanning timing clocks sequentially output from the vertical scanning circuit 16; φRES, an external reset clock input to the arithmetic processing unit 17; φSEL, an external vertical selection clock input to the arithmetic processing unit 17; and φTX1 and φTX2, first and second external transfer clocks input to the arithmetic processing unit 17.

The photoelectric conversion element 1 is reset by turning on the transfer switch 5 and reset switch 4. After the transfer switch 5 is turned off, accumulation operation starts. At the end of the accumulation time, AND operation of φSEL and the timing clock V1 from the vertical scanning circuit 16 are performed, so that a vertical selection clock φsel1 goes high at time T0, and then the vertical selection MOS transistor 3 is turned on to operate source follower amplifiers corresponding to the pixels on the first and second lines. Similarly, NAND operation of φRES and the timing clock V1 from the vertical scanning circuit 16 are performed, so that a reset clock φres1 goes low, and then the reset of the FD portion 204 is stopped, so that the FD portion 204 is floated. At time T1, a clock φTN goes high, and the dark voltage of the FD portion 204 is output to the accumulation capacitor $C_{TN}$ 10 by source follower operation.

To output photoelectrical conversion outputs from the pixels on the first line, AND operation of φTX1 and the timing clock V1 from the vertical scanning circuit 16 are performed at time T2, so that a transfer cl ock φtx11 goes high to turn on the transfer MOS transistor 5, and then signal charges are transferred to the FD portion 204. With this receiving of the charges, the potential of the FD portion 204 appears to change depending on light. At time T3, a clock φTS goes high, and the voltage of the FD portion 204 is output to the accumulation capacitor $C_{TS}$ 11 by source follower operation. At this time, dark and bright outputs from the pixels on the first line are respectively accumulated in the accumulation capacitors $C_{TN}$ 10 and $C_{TS}$ 11. At time T4, a horizontal output line reset clock φHC temporarily goes high to reset the horizontal output line. The dark and bright outputs from the pixels are output in response to a scanning timing signal from the horizontal scanning circuit 15 during the horizontal transfer period. Then, the differential output amplifier 14 obtains a differential output Vout between the two outputs, thereby outputting a signal having a high S/N ratio from which random noise and fixed pattern noise of pixels are removed.

The operation can be easily switched to signal read-out of the second line by clock operation using the transfer clock φTX2 instead of the external transfer clock φTX1 at the same timing in the above-described read sequence.

The first embodiment realizes sensor read operation by generating a vertical scanning timing signal only once while controlling the pixel arrays of the two, first and second lines. Thus, the circuit arrangement of the vertical scanning circuit can be simplified, the vertical scanning circuit can be reduced along with pixel reduction, and a small-size solid-state image pickup element can be implemented.

In the first embodiment, a pair of circuits for generating the reset clock φres and vertical selection clock φsel necessary for read of each of the first and second lines are arranged for and shared by the two, first and second lines, thereby also reducing the circuit scale.

Figure 4:
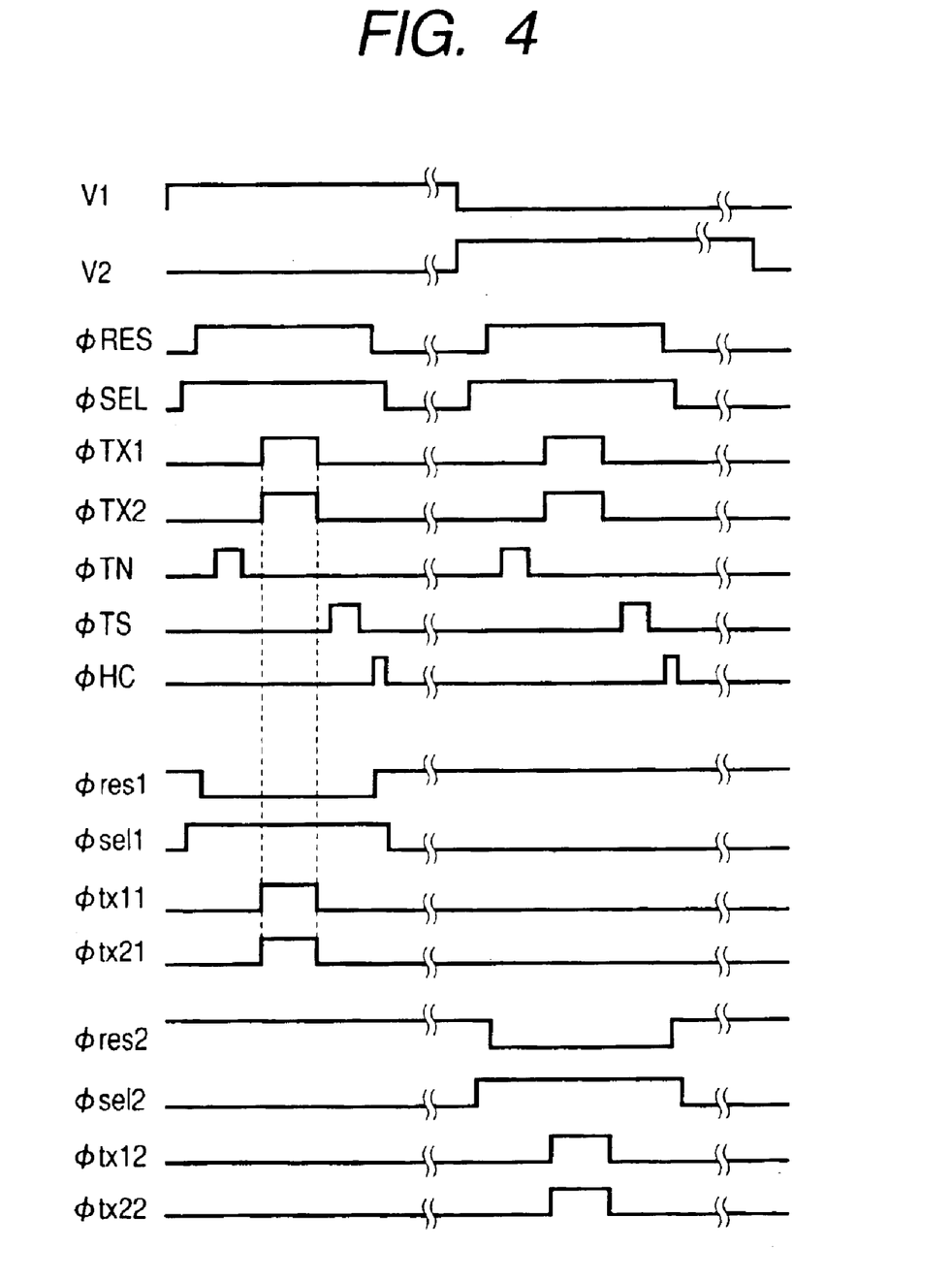
FIG. 4 is a second timing chart according to the first embodiment of the present invention.

Addition and read-out of signals from two pixels at the FD portion 204 can also be realized by changing only the timings of application pulses without changing the circuit arrangement of the first embodiment. FIG. 4 is a timing chart when signals from two, upper and lower pixels are added. The timings of the transfer clocks φtx11 and φtx12 are shifted to each other by one line in FIG. 3 showing the non-addition mode, whereas their timings are the same in the addition mode. More specifically, to simultaneously read out signals from the photoelectric conversion elements 1-1 and 1-2, the clock φTN goes high to read out a noise component from a vertical output line. Then, the transfer clocks φtx11 and φtx12 simultaneously go high and low respectively, to transfer signals to the FD portion 204. Accordingly, the signals from the two, upper and lower photoelectric conversion elements 1 can be added by the FD portion 204 at the same timing.

The first embodiment can easily implement addition function by only changing the timings of the external transfer clocks φTX1 and φTX2.

The arithmetic processing unit 17 in the first embodiment is made up of AND and NAND gates, but is not limited to this.

Figure 11:
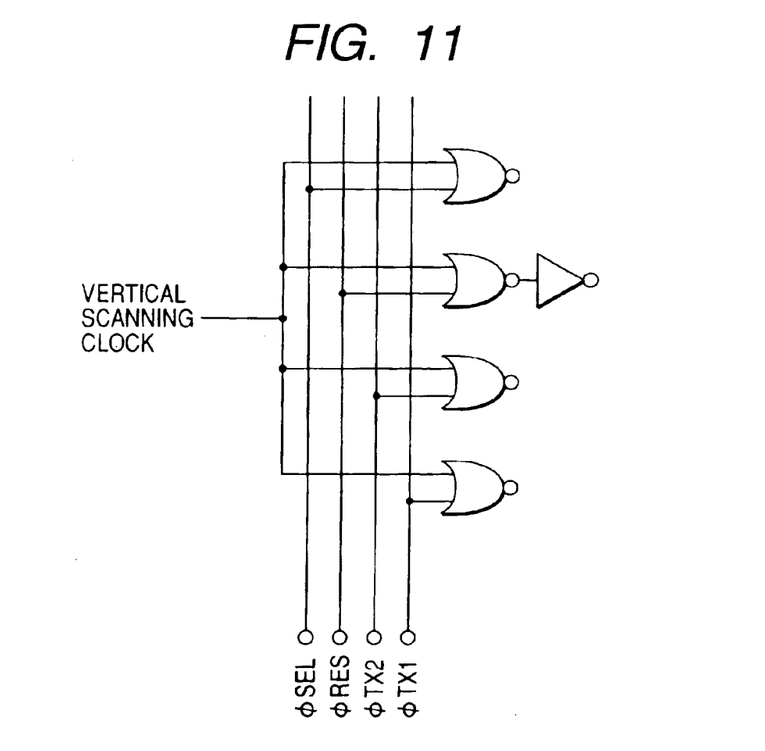
FIG. 11 is a circuit diagram showing an arrangement when an arithmetic processing unit is constituted by OR and NOR gates.
Figure 12:
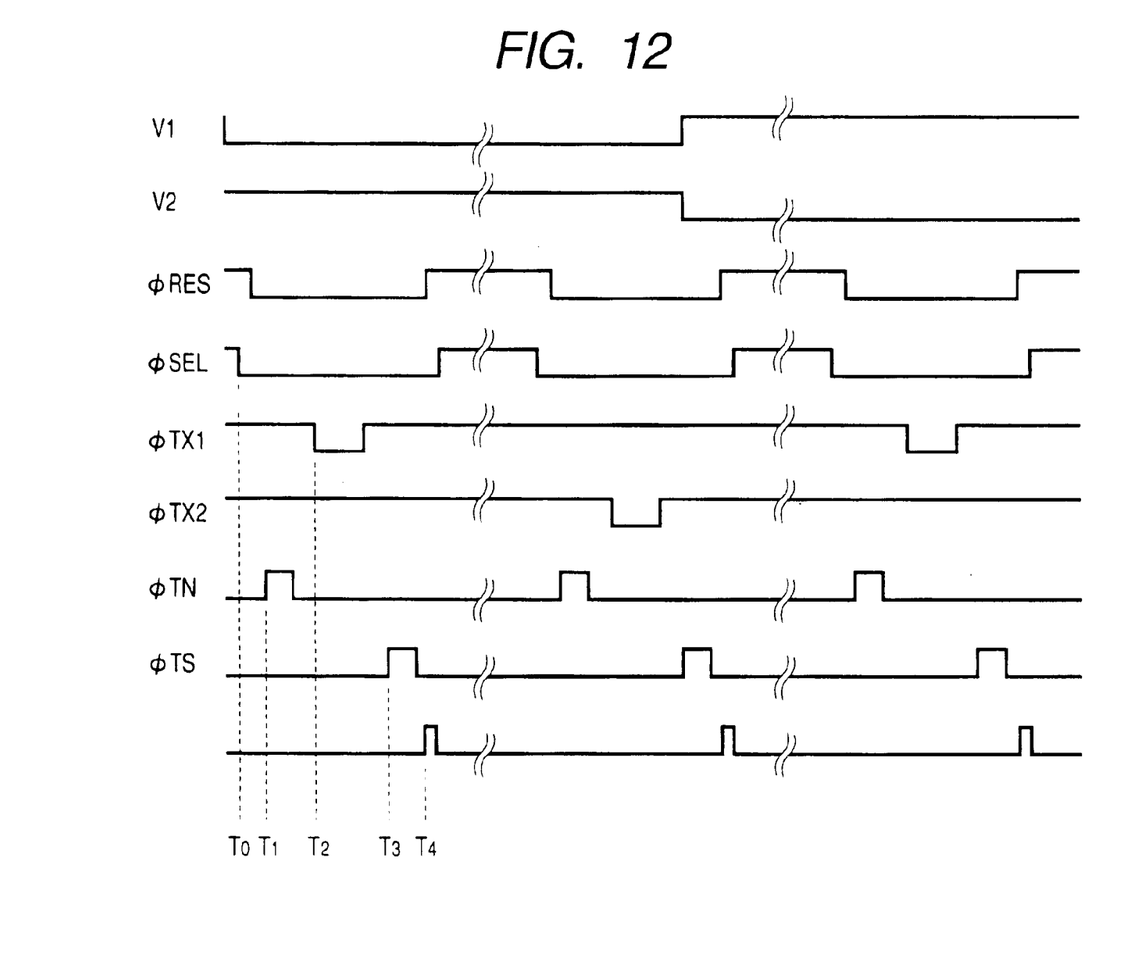
FIG. 12 is a timing chart showing the operation of the arrangement in FIG. 11.

FIG. 11 shows an arrangement of the first embodiment when the arithmetic processing unit is made up of OR and NOR gates. FIG. 12 is a timing chart showing the operation in this arrangement. This arrangement can also generate a desired clock by processing the vertical scanning timing clock and the clocks φRES, φSEL, φTX1, and φTX2 by the arithmetic processing unit. In the pixel layout represented by this arrangement, the number of transistors which constitute gates can be more reduced when the arithmetic processing unit is made up of OR and NOR gates than when it is made up of AND and NAND gates. This can further reduce the circuit scale.

Figure 5:
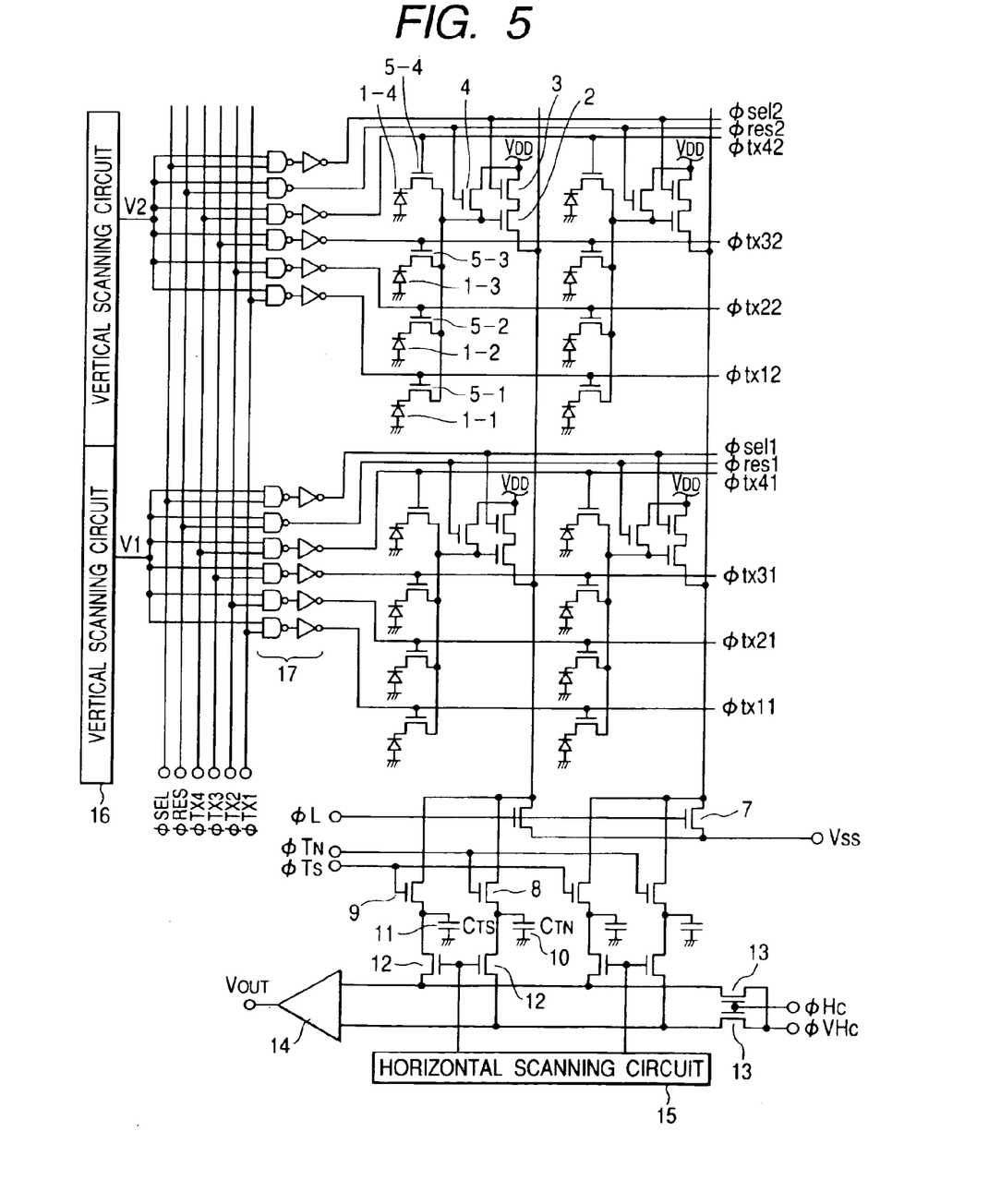
FIG. 5 is a circuit diagram for explaining the second embodiment of the present invention.

FIG. 5 is a circuit diagram showing the equivalent circuit of a solid-state image pickup element according to the second embodiment of the present invention. In the second embodiment, four pixels in the Y direction form one pixel block, and one vertical scanning circuit 16 is arranged for every four pixels.

In the second embodiment, sensor read operation can be performed by generating a vertical scanning timing signal only once while controlling the pixel arrays of the four, first to fourth lines. The circuit arrangement of the vertical scanning circuit can be more simplified than in the first embodiment. The scanning circuit can be reduced along with pixel reduction to implement a smaller-size solid-state image pickup element.

A pair of circuits for generating a reset clock φres and vertical selection clock φsel are arranged for and shared by the four, first to fourth lines, thereby also reducing the circuit scale.

Addition and read-out of signals from four pixels in the Y direction at an FD portion 204 can also be easily realized by changing only the timings of application pulses without changing the circuit arrangement of the second embodiment.

Figure 6:
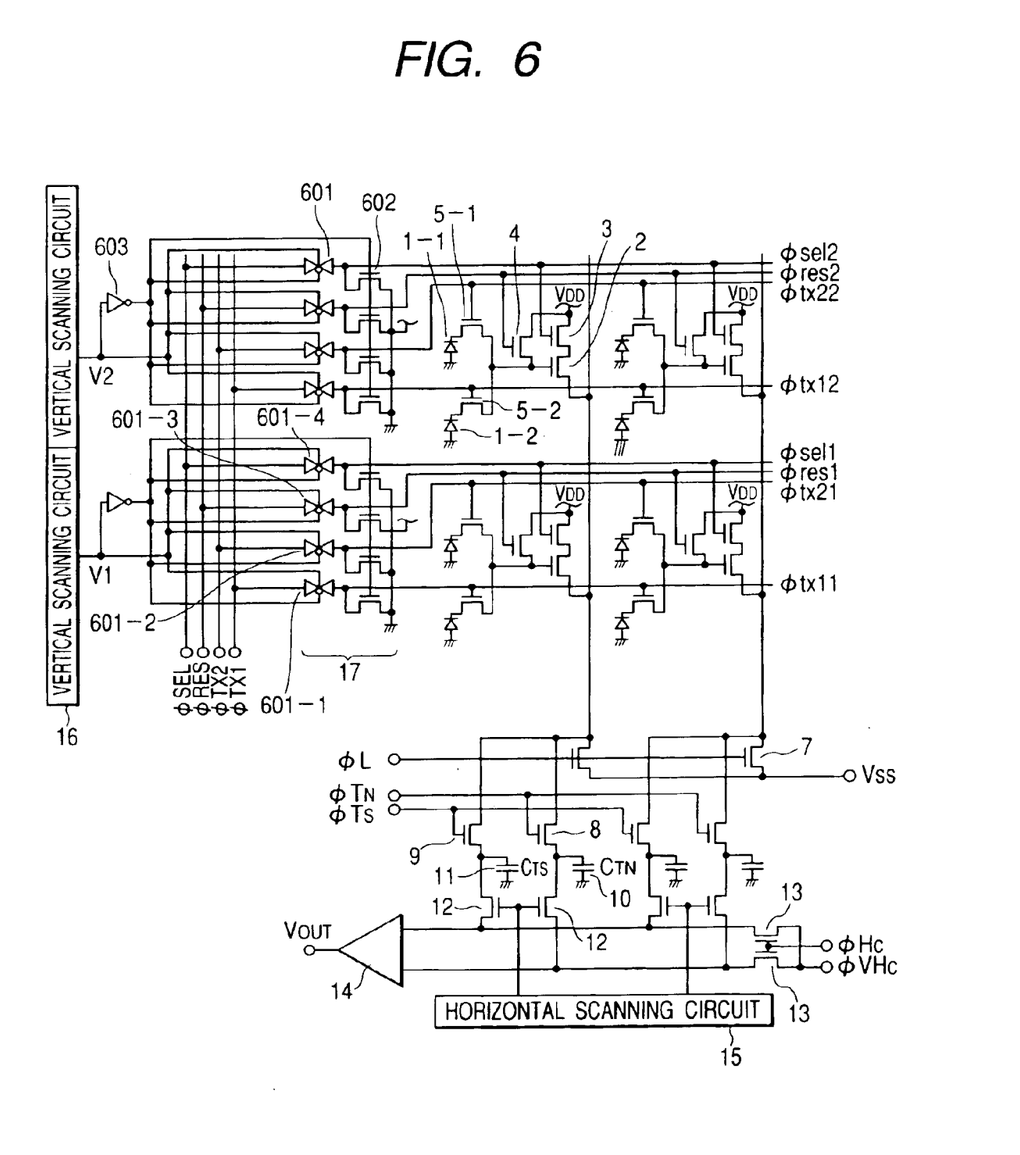
FIG. 6 is a circuit diagram for explaining the third embodiment of the present invention.

FIG. 6 is a circuit diagram showing the equivalent circuit of a solid-state image pickup element according to the third embodiment of the present invention. In the third embodiment, an arithmetic processing unit 17 is comprised of transfer gates 601 and switch MOS transistors 602. Reference numeral 603 denotes an inverter which generates the inverted signal of a vertical scanning timing clock.

The operation of the third embodiment will be explained with reference to the timing chart of FIG. 3. Similar to the first embodiment, after photoelectric conversion elements are reset, accumulation operation starts. At the end of the accumulation time, a timing output V1 from a vertical scanning circuit 16 goes high to turn on transfer gates 601-1 to 601-4. External clocks φSEL, φRES, φTX1, and φTX2 are transferred to pixels via the transfer gates 601-1 to 601-4, and act as clocks which operate respective pixels at the same timings as those described in the first embodiment. After signals on the first and second lines are read out, the vertical scanning timing clock V1 goes low to turn on the switch MOS transistors 602, and the gates of vertical selection MOS transistors 3 and those of transfer MOS transistors 5 corresponding to the first and second lines are fixed to a turn-off potential. The gates of reset MOS transistors 4 are fixed to a turn-on potential.

The third embodiment also attains the same effects as those of the first and second embodiments. In addition, the third embodiment can reduce the circuit scale of the arithmetic processing unit 17 much more than the first and second embodiments. In the third embodiment, an external clock is directly transferred to the gate of a pixel transistor via the transfer gate 601. In the first and second embodiments, the clock amplitude is uniquely determined by the power supply voltage of a logic gate. In the third embodiment, the clock amplitude can be freely changed by changing the amplitude of an input external clock. For example, the gate voltage when the transfer MOS transistor is OFF is set slightly higher than the threshold voltage of the MOS during the accumulation period. This setting enables lateral overflow draining of discharging to a power source VDD, through the transfer MOS transistor and reset MOS transistor, excessive charges generated when strong light is incident on a photoelectric conversion element 1.

Figure 7:
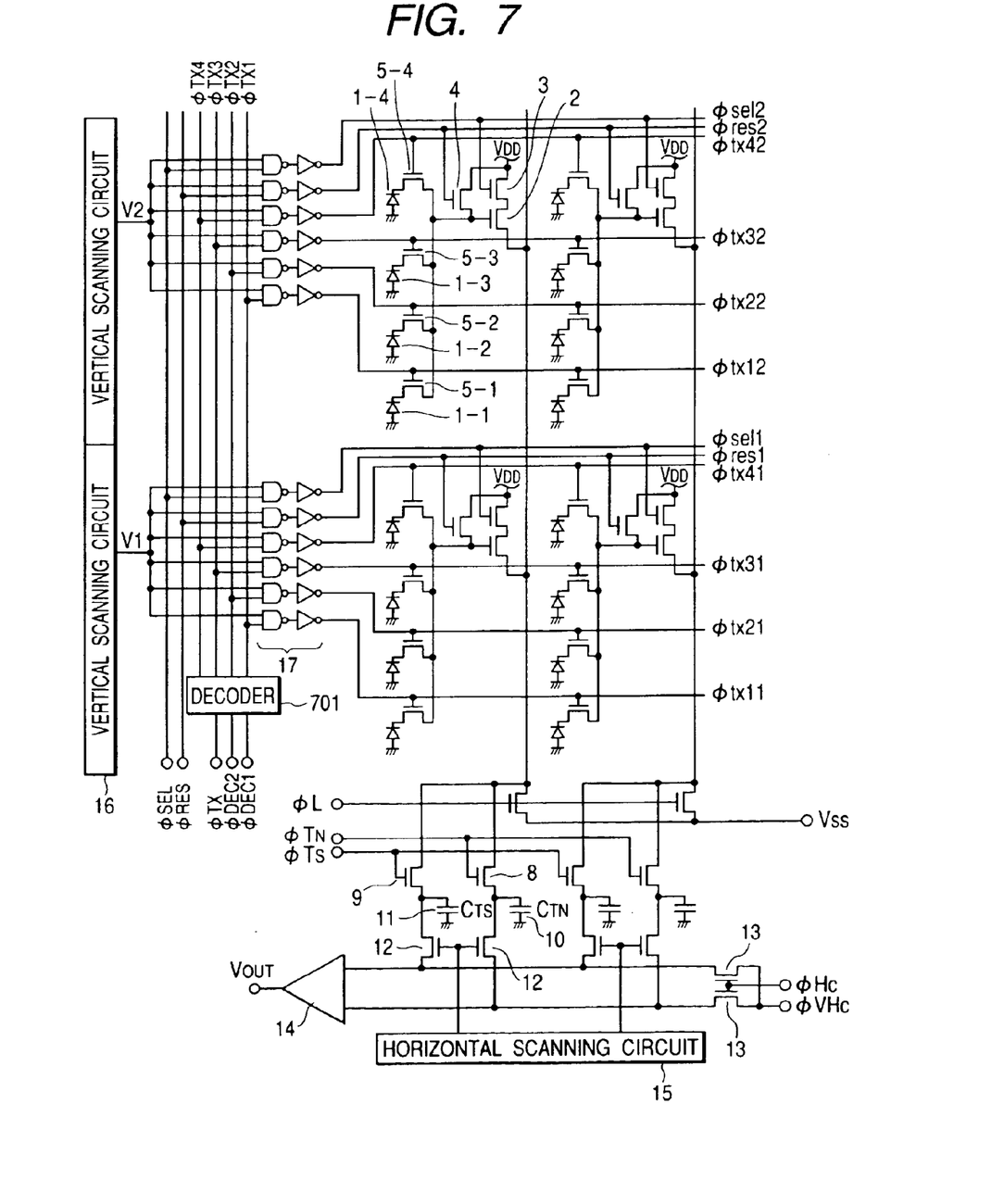
FIG. 7 is a circuit diagram for explaining the fourth embodiment of the present invention.

FIG. 7 is a circuit diagram showing the equivalent circuit of a solid-state image pickup element according to the fourth embodiment of the present invention. In the fourth embodiment, a decoder circuit 701 is arranged between an external clock input portion and an arithmetic processing unit to reduce the number of externally input clocks.

Figure 8:
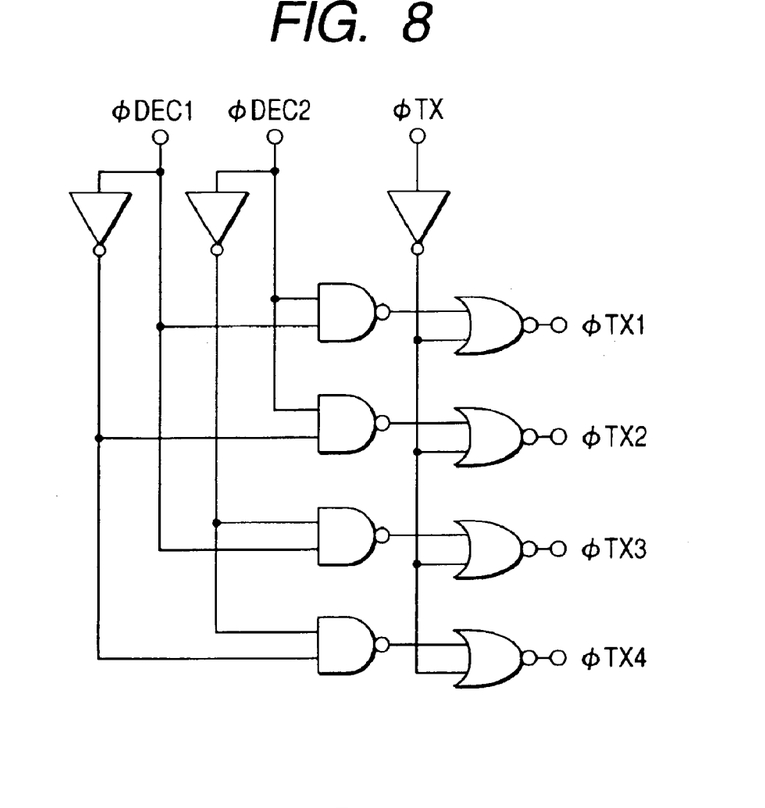
FIG. 8 is a circuit diagram showing a decoder circuit.
Figure 9:
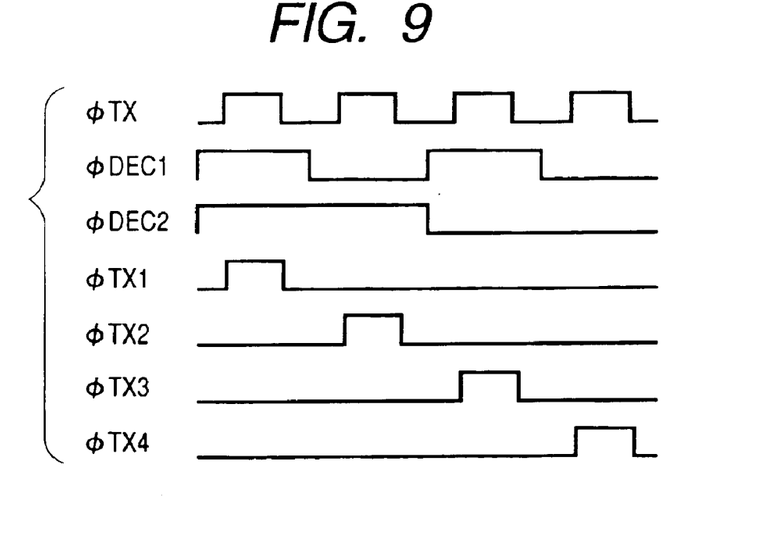
FIG. 9 is a timing chart showing the operation of the decoder circuit.

FIG. 8 is a circuit diagram showing the decoder circuit, and FIG. 9 is a timing chart showing its operation. As shown in FIG. 9, an external clock φTX is distributed to any one of φTX1 to φTX4 in accordance with whether decoder clocks φDEC1 and φDEC2 are high or low, thereby outputting the selected clock. The output clocks φTX1 to φTX4 and vertical scanning timing clocks are ANDed to generate transfer clocks.

Compared to the second embodiment, the fourth embodiment can reduce the number of external clocks by one by arranging the decoder circuit 701. In the fourth embodiment, four pixels in the Y direction form one pixel block. For example, when eight pixels form one pixel block, the second embodiment requires eight external transfer clocks, but the fourth embodiment can realize an operation similar to the above-described one by a total of four clocks, i.e., one external transfer clock and three decoder clocks.

The fourth embodiment can, therefore, obtain new effects: the number of external clocks can be reduced, the solid-state image pickup element can be easily controlled, and the area for laying out clock wires can be reduced.

The vertical scanning circuit in each of the first to fourth embodiments may be a shift register circuit or decoder circuit. The shift register circuit can reduce the circuit scale more than the decoder circuit. The decoder circuit can freely select the pixel column selection order and can realize various signal read-out orders in comparison with the shift register circuit.

As has been described above, the first to fourth embodiments can implement a solid-state image pickup element in which the peripheral circuit is downsized, resulting in low cost by downsizing and high yield, a small-size package, a small-size optical system, and a simple external control circuit.

Figure 10:
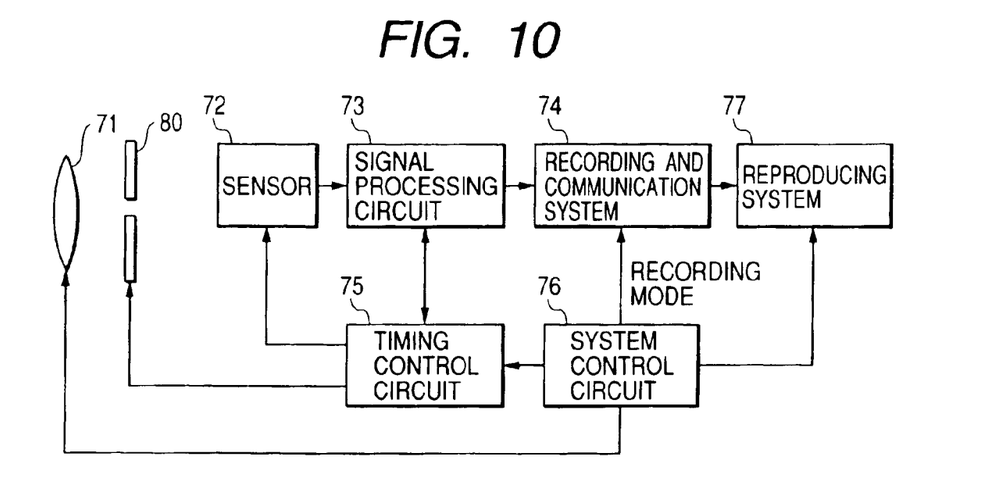
FIG. 10 is a schematic block diagram showing an image pickup system according to the present invention.

FIG. 10 is a schematic view showing an image pickup apparatus such as a digital camera. As shown in FIG. 10, image light passing through an optical system 71 and iris 80 forms an image on a CMOS sensor 72. The optical information is converted into an electrical signal by a pixel array arranged on the CMOS sensor 72. Noise is removed from the electrical signal, and the resultant signal is output. The output signal undergoes signal conversion processing by a signal processing circuit 73 by a predetermined method, and output. The processed signal is recorded by an information recording device or transferred via a recording and communication system 74. The recorded or transferred signal is reproduced by a reproducing system 77. The iris 80, CMOS sensor 72, and signal processing circuit 73 are controlled by a timing control circuit 75, whereas the optical system 71, timing control circuit 75, recording and communication system 74, and reproducing system 77 are controlled by a system control circuit 76. In this case, the CMOS sensor 72 is a solid-state image pickup element described in each of the first to fourth embodiments.

Many widely different embodiments of the present invention may be constructed without departing from the spirit and scope of the present invention. It should be understood that the present invention is not limited to the specific embodiments described in the specification, except as defined in the appended claims.

What is claimed is:

1. A solid-state image pickup element comprising:
   a plurality of pixel blocks each having a plurality of photoelectric conversion elements, a plurality of transfer switches for transferring signals from said respective photoelectric conversion elements, and a common amplifier for receiving signals from said plurality of transfer switches;
   a scanning circuit for outputting a scanning clock for each pixel block; and
   an operation processing circuit for receiving a plurality of transfer clocks corresponding to said plurality of transfer switches in said pixel block, for performing operation processing for the scanning clock output from said scanning circuit and the plurality of transfer clocks, and for supplying processed signals as clocks for driving said plurality of transfer switches.

2. An element according to claim 1, further comprising a decoder for converting one transfer clock input into a plurality of transfer clock inputs corresponding to said plurality of transfer switches in said pixel block and inputting the plurality of transfer clock inputs to said operation processing circuit.

3. An element according to claim 1, wherein said operation processing circuit includes an AND operation processing circuit for receiving the scanning clock and the transfer clock.

4. An element according to claim 2, wherein said operation processing circuit includes an AND operation processing circuit for receiving the scanning clock and the transfer clock.

5. An element according to claim 1, wherein said operation processing circuit includes an OR operation processing circuit for receiving the scanning clock and the transfer clock.

6. An element according to claim 2, wherein said operation processing circuit includes an OR operation processing circuit for receiving the scanning clock and the transfer clock.

7. An element according to claim 1, wherein
   when said plurality of transfer switches of said pixel block are set as a plurality of first transfer switches, said operation processing circuit is formed from a plurality of second transfer switches,
   the scanning clock is input to gates of said plurality of second transfer switches, and the transfer clock inputs are supplied to said first transfer switches via said second transfer switches.

8. An element according to claim 2, wherein
when said plurality of transfer switches of said pixel blocks are set as a plurality of first transfer switches, said operation processing circuit is formed from a plurality of second transfer switches,
the scanning clock is input to gates of said plurality of second transfer switches, and
the transfer clock inputs are supplied to said first transfer switches via said second transfer switches.

9. A solid-state image pickup element comprising:
a plurality of pixel blocks each having a plurality of photoelectric conversion elements, a plurality of transfer switches for transferring signals from said respective photoelectric conversion elements, and a common amplifier for receiving signals from said plurality of transfer switches;
a scanning circuit for outputting a scanning clock for each pixel block;
a reset switch arranged in each pixel block to reset a signal input portion; and
an operation processing circuit for receiving a reset clock input, for performing arithmetic processing for the scanning clock and the reset clock input, and for supplying a processed signal as a clock for driving said reset switch.

10. A solid-state image pickup element comprising:
a plurality of pixel blocks each having a plurality of photoelectric conversion elements, a plurality of transfer switches for transferring signals from said respective photoelectric conversion elements, and a common amplifier for receiving signals from said plurality of transfer switches;
a scanning circuit for outputting a scanning clock for each pixel block;
a selection switch arranged in each pixel block to select said pixel block; and
an operation processing circuit for receiving a selection clock input, for performing arithmetic processing for the scanning clock and the selection clock input, and for supplying a processed signal as a clock for driving said selection switch.

11. An image pickup apparatus comprising:
said solid-state image pickup element defined in claim 1;
an optical system for forming light into an image on said solid-state image pickup element; and
a signal processing circuit for processing an output signal from said solid-state image pickup element.

* * * * *